(12) United States Patent
Takayanagi

(10) Patent No.: US 8,216,663 B2
(45) Date of Patent: Jul. 10, 2012

(54) SURFACE-MODIFIED MEMBER, SURFACE-TREATING PROCESS AND APPARATUS THEREFOR

(75) Inventor: Koichiro Takayanagi, Narita (JP)

(73) Assignee: Canaan Precision Co., Ltd., Osaka (JP)

( * ) Notice: Subject to any disclaimer, the term of this patent is extended or adjusted under 35 U.S.C. 154(b) by 765 days.

(21) Appl. No.: 11/922,921

(22) PCT Filed: Jun. 15, 2006

(86) PCT No.: PCT/JP2006/312042
§ 371 (c)(1),
(2), (4) Date: Dec. 27, 2007

(87) PCT Pub. No.: WO2007/000901
PCT Pub. Date: Jan. 4, 2007

(65) Prior Publication Data
US 2009/0035523 A1 Feb. 5, 2009

(30) Foreign Application Priority Data
Jun. 28, 2005 (JP) ................................. 2005-188584

(51) Int. Cl.
*B32B 3/10* (2006.01)
*B44C 1/22* (2006.01)
*C23C 16/02* (2006.01)
*F22B 1/08* (2006.01)
(52) U.S. Cl. ..................... 428/156; 216/74; 427/255.28; 392/396; 392/400; 204/192.12
(58) Field of Classification Search .................. 428/156; 216/74; 427/255.28; 204/192.12; 392/396, 392/400
See application file for complete search history.

(56) References Cited

U.S. PATENT DOCUMENTS
4,904,515 A 2/1990 Matsuo et al.
(Continued)

FOREIGN PATENT DOCUMENTS
GB 2211147 A * 6/1989
(Continued)

OTHER PUBLICATIONS

Machine English Translation of JP-2004/079595_A; Nitta, Takehisa; Substrate Cleaning Method; Mar. 11, 2004; JPO; whole document.*

(Continued)

*Primary Examiner* — David Sample
*Assistant Examiner* — Tahseen N Khan
(74) *Attorney, Agent, or Firm* — Wenderoth, Lind & Ponack, L.L.P.

(57) ABSTRACT

A member having high non-electrostatic properties and high hydrophilicity and preventing an adhesion of contaminants, a surface-treating process and an apparatus for the surface-treating process are provided.
A surface-treatment apparatus comprises a water vapor-generating unit 1, a superheating unit 5 for superheating a water vapor to generate a superheated water vapor, and a processing unit 11 for spraying the superheated water vapor to a member 14 to be treated (a ceramic, a metal) or for exposing the member to the superheated water vapor. Treating the untreated member with a superheated water vapor having a temperature 300 to 1000° C., hydrophilicity and antistatic properties are imparted to the member. The untreated member may be a member (a window member) contacting with a processing space in a vapor phase surface process apparatus (e.g., a chamber) for the surface process of a substrate by a vapor phase method such as a PVD, a CVD, or a dry etching.

18 Claims, 5 Drawing Sheets

U.S. PATENT DOCUMENTS

| | | | |
|---|---|---|---|
| 6,300,641 B1 | 10/2001 | Koh et al. | |
| 6,310,116 B1 * | 10/2001 | Yasuda et al. | 523/106 |
| 6,432,510 B1 * | 8/2002 | Kim et al. | 428/142 |
| 2005/0258578 A1 | 11/2005 | Birnbaum et al. | |

FOREIGN PATENT DOCUMENTS

| | | | |
|---|---|---|---|
| JP | 59000583 A * | 1/1984 | |
| JP | 62-122212 | 6/1987 | |
| JP | 6-86960 | 3/1994 | |
| JP | 8-190994 | 7/1996 | |
| JP | 2003-254095 | 9/2003 | |
| JP | 2003254095 A * | 9/2003 | |
| JP | 2004-079595 | 3/2004 | |
| JP | 2004-346427 | 12/2004 | |
| JP | 2004346427 A * | 12/2004 | |
| JP | 2005-503312 | 2/2005 | |
| WO | 03/024894 | 3/2003 | |

OTHER PUBLICATIONS

Machine_English_Translation_JP_2003254095_A; Takahashi, Teruo; Exhaust Brake Device; Sep. 10, 2003; JPO; whole document.*

Office Action dated Jan. 19, 2010 from JPO for Japanese Patent Application No. JP 2007-523397 with English translation.

International Search Report issued Aug. 29, 2006 in the International (PCT) Application of which the present application is the U.S. National Stage.

* cited by examiner

SURFACE-MODIFIED MEMBER, SURFACE-TREATING PROCESS AND APPARATUS THEREFOR

This application is a U.S. national stage of International Application No. PCT/JP2006/312042 filed Jun. 15, 2006.

TECHNICAL FIELD

The invention relates to, for example, a process for surface-treating (or surface-modifying) a member constituting an apparatus (e.g., a semiconductor manufacturing apparatus or a display device such as a liquid crystal display manufacturing apparatus) for a surface fabrication or surface process (such as a microfabrication or a thin-film processing or lithography) of base materials or substrates by vapor phase method (or gas phase process). The process is useful for suppressing electrostatic charge over a long period of time, sustaining high hydrophilicity, and preventing the attachment (or adhesion) of dust or dirt to the surface of the surface-treated member (or the surface-modified member). The invention also relates to a surface-treated member (or a surface-modified member) obtained by the surface-treating (or the surface-modifying) process and a surface-treating apparatus (or a surface-modifying apparatus).

BACKGROUND ART

In a microfabrication or a thin-film processing or lithographic technique of a semiconductor, a liquid crystal display device or the like, a base metal or a substrate is subjected to a surface process utilizing a vapor phase method such as a physical vapor deposition, a chemical vapor deposition, or an etching. In an apparatus for the vapor phase surface process, particles (organic or inorganic scattering particles such as particles for depositing) that may be accelerated or ionized are dispersed in a space of the apparatus. Such particles adhere to the inner surface of the apparatus, so that the apparatus is contaminated with the particles. For example, an observation or an inspection window (e.g., a window for detecting an end point by sensor and a window for detecting an end point) of a dry etching apparatus, comprising a transparent member such as a quartz glass, is contaminated with a layer or coating (e.g., an aluminum chloride layer, a resist layer, and a fluorine layer) of the floating (or the dispersing) particles, with proceeding dry etching. Such a layer on the window hinders observations of the inside of the apparatus when an end point is confirmed, and an overetching is caused. For reuse of the observation window (the quartz glass) of the apparatus, the window is periodically washed and polished to regenerate (or regain) the surface smoothness and the transmittance. Accordingly, whenever the observation window is contaminated, the maintenance work for washing the surface to regenerate the smoothness and the transmittance of the window (the quartz glass) is necessary, and the productivity of the apparatus is greatly decreased. Furthermore, when an etching gas such as a chlorine gas is introduced into a dry etching space through a large number of micro pores (for example, pores having a diameter of 300 to 750 μm) formed on a metal plate (for example, an aluminum plate that has been subjected to an anodizing or an anodization or the like), in order to process a surface of a substrate (a glass substrate or the like), a reaction of the metal with the etching gas generates reaction products, and the products accumulate in the pores on the metal plate. The pores are consequently plugged. It is necessary to remove the products from the pores for reuse of the plate or to replace the plate with a new metal plate. Therefore, the necessity of the frequent maintenance work greatly decreases the productivity of the apparatus for processing the substrates.

Japanese Patent Application Laid-Open No. 86960/1994 (JP-6-86960A, Patent Document 1) discloses a washing apparatus comprising a washing tank for accommodating an object to be washed, a cleaning liquid tank for containing a cleaning liquid, a water vapor (or a water steam) tank for containing a superheated water vapor, and means for supplying a pressurized gas to pressurize the washing tank and the cleaning liquid tank. In the apparatus, the object to be washed is immersed in the cleaning liquid and cleaned in the cleaning tank. Then the cleaning liquid is removed from the washed object by jetting a superheated water vapor. The document describes that a problem (washing for removing a micron-size dust or dirt adhered with an oil to part of a precision instrument) is solved, which has not been solved by jetting only a superheated water vapor. Japanese Patent Application Laid-Open No. 79595/2004 (JP-2004-79595A, Patent Document 2) discloses a process for washing a substrate to remove a resist therefrom, which comprises subjecting a substrate having a resist on a surface thereof to a plasma ashing for less than 1 minute when the resist is not completely removed and jetting a cleaning gas comprising a water vapor to the surface of the substrate. The document also describes that a saturated water vapor and a superheated water vapor may be used as the water vapor. Furthermore, Japanese Patent Application Laid-Open No. 346427/2004 (JP-2004-346427A, Patent Document 3) discloses a surface treatment that comprises disposing a metal workpiece in a processing space, after making the processing space vacuous, and introducing a high-pressure superheated water vapor into the processing space to form an oxide layer on the surface of the metal workpiece. The document also describes that forming the oxide layer of $Fe_3O_4$, not FeO or $Fe_2O_3$, on the surface of the metal workpiece improves the smoothness (lubricating property) and durability (wear-resistance and corrosion resistance) of the metal workpiece.

However, a method for preventing the adhesion of contaminants to a member, particularly, a method for preventing the adhesion of contaminants to a member by providing a high hydrophilicity and/or antistatic properties to a member, has not been known.

[Patent Document 1] JP-6-86960A (Claims)
[Patent Document 2] JP-2004-79595A (Claims and column of [Effects of The Invention])
[Patent Document 3] JP-2004-346427A (Claims, and paragraph Nos. [0021] and [0046])

DISCLOSURE OF THE INVENTION

Problems to be Solved by the Invention

It is therefore an object of the present invention to provide a surface-treating process (or a surface-modifying process) for preventing an adhesion of contaminants to a member over a long period of time, an apparatus therefor, and a surface-treated member (or a modified member).

Another object of the present invention is to provide a surface-treating process (or a surface-modifying process) for improving antistatic properties (electrostatic eliminating properties) and/or hydrophilicity of a member to be treated, an apparatus therefor, and a surface-treated member (or a modified member).

A further object of the invention is to provide a surface-treating process (or a surface-modifying process) for preventing the adhesion of components (e.g., particulate components or the like) generated in a vapor phase surface process to the inner surface of a surface processing apparatus (for example, a chamber) for a long period of time, an apparatus therefor, and a surface-treated member (or a modified member).

Means to Solve the Problems

The inventor of the present invention made intensive studies to achieve the above objects and finally found that spraying or jetting a superheated water vapor to a member imparts a high hydrophilicity and antistatic properties (or electrostatic eliminating properties) to the member and prevents the adhesion of contaminants (e.g., floating particles in a surface process apparatus) for a long period of time. The inventor found that such a surface-treating process realizes a long life of the member and the surface processing apparatus comprising the member decreases the frequent maintenance work and prevents the adhesion and accumulation of the particles on inside of the surface processing apparatus. In addition, the inventor found that the surface-treatment of the member consequently leads to an increase of the process yield of devices with a remarkable decrease of the production cost. Incidentally, the above-mentioned member may be a member contacting with (or exposed to) the processing space (e.g., a member constituting an inner wall and a member disposed in the processing space) in a semiconductor manufacturing apparatus or a liquid crystal device manufacturing apparatus. Such an apparatus includes, for example, a surface process apparatus utilizing a vapor phase method (e.g., a physical vapor deposition apparatus, a chemical vapor deposition apparatus, and an etching apparatus). The present invention was accomplished based on the above findings.

That is, the surface-modified member (or the surface-treated member) of the present invention is characterized by high non-electrostatic properties (or electrostatic eliminating properties). For example, in an ash test, the surface-modified member does not have the adhesion of ashes. Furthermore, when the surface of the surface-treated member of the present invention is analyzed by an X-ray photo electron spectrum, the carbon atomic concentration is decreased and the oxygen atomic concentration is increased, in comparison with a surface of an untreated member. In addition, the surface-treated member is inactive to an active component such as a reactive gas or an adhesive component and can effectively prevent the adhesion of contaminants.

For example, when the depth profile of the surface of the surface-treated member (such as a ceramic or an alumite) is analyzed by the X-ray photo electron spectrum at an etching speed of 5 nm/min, the carbon atomic concentration may be any one of 10 to 50% at an etching time of 0 second, 7 to 35% at an etching time of 15 seconds, 5 to 30% at an etching time of 30 seconds, and 3 to 25% at an etching time of 60 seconds; and the oxygen atomic concentration may be any one of 30 to 60% at an etching time of 0 second, 35 to 62% at an etching time of 15 seconds, 43 to 63% at an etching time of 30 seconds, and 45 to 65% at an etching time of 60 seconds.

Furthermore, when the depth profile of the surface of the surface-treated member comprising a metal (such as a silicon) is analyzed by the X-ray photo electron spectrum at an etching speed of 5 nm/min, the oxygen atomic concentration may be any one of 32 to 45% at an etching time of 0 second, 28 to 42% at an etching time of 15 seconds, 22 to 36% at an etching time of 30 seconds, and 13 to 25% at an etching time of 60 seconds.

Moreover, when the depth profile of the surface of the surface-treated member (such as a ceramic or an alumite) is analyzed by the X-ray photo electron spectrum at an etching speed of 5 nm/min, the atomic concentrations of the member compared with an untreated member are as follows: the reduction rate of the carbon atomic concentration may be any one of 10 to 80% at an etching time of 0 second, 15 to 90% at an etching time of 15 seconds, 20 to 90% at an etching time of 30 seconds, and 20 to 90% at an etching time of 60 seconds; and the increase rate of the oxygen atomic concentration may be any one of 15 to 120% at an etching time of 0 second, 10 to 150% at an etching time of 15 seconds, 7 to 130% at an etching time of 30 seconds, or 5 to 125% at an etching time of 60 seconds.

The surface-modified member (or the surface-treated member) of the present invention is characterized by high hydrophilicity. For example, when measuring a contact angle of water on the surface of the treated member (the surface-treated member), the contact angle of water may be about 10 to 100° at a temperature of 15 to 25° C. and a humidity of 55 to 70% RH (for example, at a temperature of 20° C. and a relative humidity of 60% RH). The contact angle of water on the surface of the treated member is usually 15 to 70° lower than the contact angle of water on an untreated member.

The surface-modified member may practically comprise an oxide ceramic, an oxidized metal or a metal, and the oxide ceramic, the oxidized metal or the metal comprises at least one element selected from the group consisting of an element of the Group 4 of the Periodic Table of Elements, an element of the Group 5 of the Periodic Table of Elements, an element of the Group 13 of the Periodic Table of Elements, and an element of the Group 14 of the Periodic Table of Elements (for example, at least one element selected from silicon and aluminum). Typical examples of the surface-modified members include at least one comprising a member selected from a silica or a glass, an alumina, an anodized aluminum, silicon, and aluminum.

The surface-treating process (or the surface-modifying process) of the invention is useful for preventing the adhesion of contaminants to a member, and an untreated member (a member to be treated) is treated with a superheated water vapor. In this process, the untreated member may be treated with a superheated water vapor having a temperature of 300 to 1000° C. (for example, 350 to 1000° C.). The untreated member may be treated in a non-oxidizing atmosphere. The untreated member may be, for example, a member that may be contactable with a processing space (e.g., an atmosphere or a processing space under a reduced pressure, and a processing space containing a floating or a flying particle) in a surface process apparatus by a vapor phase method (an apparatus (a chamber or the like) for surface processing abase material by vapor phase). For example, a member constituting at least the inner surface of the surface process apparatus or disposed in the surface process apparatus. The untreated member may practically be at least one member usually selected from a ceramic and a metal. The untreated member may also be a base material or a substrate treated or processed by a vapor phase method; or at least one member selected from an electrode member, a holder or a supporter, a boat, a covering member, a shielding member or a cap, an insulator, a constituting member for an inlet or an exhaust duct, or a constituting member for a channel, an inner wall or an interior member, a plate, and a joining or a fixing member. Further, the untreated member may be, for example, a member constituting an observation window for observing the inside of the vapor phase-surface process apparatus or a member having a pore through which an etching gas may pass. The untreated member may practically be an oxide ceramic, an oxidized metal or a metal, and the oxide ceramic, the oxidized metal or the metal comprises at least one element selected from the group consisting of an element of the Group 4 of the Periodic Table of Elements, an element of the Group 5 of the Periodic Table of Elements, an element of the Group 13 of the Periodic Table of Elements, and an element of the Group 14 of the Periodic Table of Elements (for example, at least one element selected from silicon and aluminum). Typical examples of the untreated members include at least one member selected from a silica or a glass, an alumina, an anodized aluminum, silicon, and aluminum. Examples of the vapor phase methods may include, for example, a physical vapor deposition, a chemical vapor deposition, an ion beam mixing technique, an etching technique, and an impurity doping technique. In the surface-treatment, an amount (a spraying or a jetting amount) of the superheated water vapor, depending on the species of the untreated members, may be, for example, about 100 g/h to 100 kg/h in terms of water vapor (or flow rate) relative to 1 $m^2$ of the surface area of the untreated member. In the process, treating the untreated member with the superheated water vapor can prevent the adhesion of particles generated in the surface process using the vapor phase method. In addition to the above-mentioned advantages, the superheated water vapor treatment of the untreated member can improve hydrophilicity and/or antistatic property and inactivate the untreated member relative to a reactive component, or an adhering or attaching component.

The present invention also includes a surface-treated member (such as the surface-modified member) treated by the surface-treating process.

The present invention further includes a surface-treatment apparatus for producing a member that prevents the adhesion of contaminants. The surface-treatment apparatus having a first unit for generating a superheated water vapor and a second unit (or a chamber) for spraying or jetting the superheated water vapor from the first unit to an untreated member or for exposing an untreated member to the superheated water vapor from the first unit. In other words, the apparatus may also be an apparatus for improving antistatic properties and/or hydrophilicity of the untreated member.

Effects of the Invention

According to the present invention, the surface-treatment of the member with the superheated water vapor can prevent the adhesion of contaminants for a long period of time and improve antistatic properties and/or hydrophilicity. Moreover, the treatment allows the inner surface of an apparatus (such as a chamber) for a surface process to be free from the adhesion of components (contaminants such as particulate components) generated in the surface processing using a vapor phase method, over a long period of time. Consequently, the present invention realizes a long life of the constituting member of the apparatus (the surface processing apparatus) and the apparatus itself and thus decreases the frequency of maintenance work. In addition, since the invention prevents the adhesion of contaminants, the particles in the surface processing are inhibited from adhering and accumulating, and the process yield of the devices is improved. As a result, the production cost can be greatly reduced.

DETAILED DESCRIPTION OF THE INVENTION

Hereinafter, the present invention will be illustrated in more detail with reference to the attached drawings.

Figure 1:
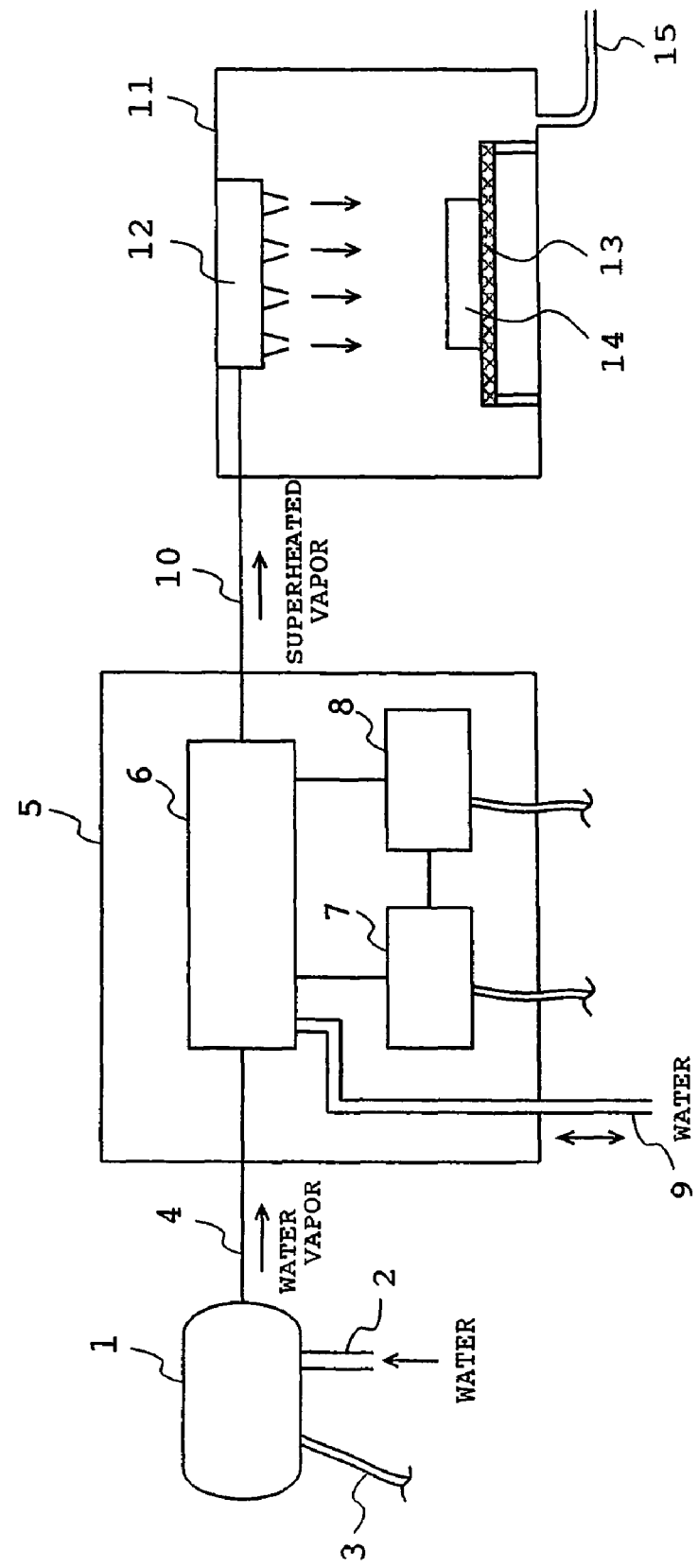
FIG. 1 is a schematic view of an apparatus to illustrate a surface-treatment apparatus of the present invention.

FIG. 1 shows a schematic view of an apparatus in accordance with an embodiment of the surface-treatment apparatus of the present invention. Referring to FIG. 1, the surface-treatment apparatus comprises a water vapor-generating unit 1 for heating a water to generate a water vapor (a saturated water vapor), a superheating unit 5 for superheating the water vapor from the unit 1 to generate a superheated water vapor, and a treating unit 11 for exposing a member to be treated 14 to (or the member contacting with) the superheated water vapor from the unit 5 under an non-oxidizing atmosphere to treat the member. Further, supply lines are connected between the units 1 and 5 and between the units 5 and 11, respectively; the line between the water vapor-generating unit 1 and the superheating unit 5 serves as a water vapor supply line 4, and the line between the superheating unit 5 and the treating unit 11 serves as a superheated water vapor supply line 10. Incidentally, in this embodiment, a quartz glass plate constituting a window member of a dry etching apparatus is used as the member to be treated (the untreated member). Moreover, the treating unit 11 comprises a quartz crucible around which a heat insulator is disposed.

The water vapor-generating unit 1 is connected with a water supply line 2 for supplying a water and equipped with a heat source (e.g., a heater) for heating the supplied water. The embodiment in FIG. 1 shows a cord 3 that connects the unit 1 to an electric power source for heating a heater. The heat source may be an electrical heat source (such as a heater) or a heat of combustion such as a boiler.

The superheating unit 5 comprises a superheating zone 6 having a superheating means (a high-frequency superheating means) 7, utilizing a high-frequency effect (or action), for superheating the water vapor (saturated water vapor) supplied through the water vapor supply line 4, a detection means (a temperature sensor) 8 for detecting a temperature of the superheated water vapor, and a cooling water supply line 9. The superheating unit 5 regulates or controls the degree of superheating with the superheating means 7 and/or the amount supplied of the cooling water through the cooling water supply line 9, based on a detection signal from the detection means 8, in the superheating zone 6.

In the processing unit 11, a member 14 is treated by spraying or jetting a superheated water vapor from a nozzle 12, and the superheated water vapor is supplied to the nozzle 12 through the superheated water vapor supply line 10 connected to the superheated unit 5. Furthermore, for treating the both sides of the member 14, the member 14 is supported by a heat-resistant supporter 13 having a net shape (in FIG. 1, a wire netting made of a stainless steel). In addition, the processing unit 11 is connected with a draining line 15 that may have an adjustable flow rate.

In the surface-treatment apparatus, the member 14 (e.g., a quartz glass) is treated with a superheated water vapor, and when the surface-treated member 14 is used as a window member of the dry etching apparatus, the surface-treated member 14 effectively prevents contaminants from adhering. The reasons of the above-mentioned advantages have not been clear, however, the results of experiments show that treating the member 14 (e.g., a quartz glass) with the above-mentioned superheated water vapor greatly decreased the electrostatic properties of the member 14, increased the electrostatic eliminating properties thereof, and imparted hydrophilicity to the surface thereof. It is probably that these factors may contribute to suppress the adhesion of contaminants to the surface-treated member 14. Such a surface-treatment apparatus may be a so-called apparatus for improving antistatic properties (electrostatic eliminating properties) and/or hydrophilicity of the untreated member. Moreover, a surface process apparatus (e.g., an etching apparatus) equipped with the surface-treated member prevents the adhesion of contaminants (to the inner surface of the apparatus) over a long period of time, and even if the contaminants adheres, the contaminants are easily cleaned up with a simple cleaning manner (e.g., wiping out and washing). Therefore, the surface-treatment apparatus realizes a long life of the member and the surface processing apparatus. Furthermore, the frequency of maintenance work for the dry etching apparatus is greatly reduced and the generation of particles in the dry etching process is inhibited. As a result, the production cost is greatly reduced with increasing the process yield of the etching treated substrate.

Incidentally, a water supplied through the water supply lines of the surface-treatment apparatus mentioned above may be a purified water, a pure water, or a tap water. Further, as long as it is possible to supply the water vapor to the superheating unit by connecting the unit to the water vapor-generating unit or other means, the water vapor-generating unit may be not essential for the apparatus of the present invention. In the treatment of the untreated member, the superheated water vapor not always needs to be sprayed or to be jetted, and it is sufficient to expose the untreated member to or contact the untreated member with the superheated water vapor. In addition, the means for superheating the water vapor is not limited to a high-frequency wave and may utilize a various heating means, for example, an electromagnetic wave (a micro wave) and a heating means such as a burner or an electric heater. For the efficient generation of the superheated water vapor and the accurate control of the temperature, an induction heating mode or means is usually employed. Moreover, in the superheating unit, the temperature of the superheated water vapor not always needs to be controlled, and the superheated water vapor generated by the superheating means may be directly supplied to the processing unit. The processing unit may comprise a thermal (or heat)-resistant member and is usually insulated. The supporting form (or structure) for the member to be treated is not particularly limited to a specific one, as far as a surface or an area of the member to be treated is exposed to the superheated water vapor. For example, the member may be supported by a leg member or supported or held by holding means such as an arm.

In the present invention, the species of the member to be treated (the untreated member) may include various members requiring to prevent the adhesion of contaminants or the stains (for example, liquid components such as oils, liquid seasonings (e.g., a soya sauce), and coffee, particulate components such as dust or dirt and flying particles, solid components such as crayons and paints). The member to be treated (i.e., the untreated member) is not particularly limited to a specific one. The member to be treated (i.e., the untreated member) that may be exposed to a liquid contaminant may include, for example, a tableware or a container such as a cup, a plate, and a glass, a pan or a fraying pan such as a cooking pan, furniture such as a table or a chair, a pipe, a coating apparatus or a member thereof, a storage tank or a storage vessel (or bath), and an apparatus for treatment with (or utilizing) a liquid phase. The member to be treated that may be exposed to a particulate contaminant or a solid contaminant may include, for example, a chute or a hopper constituting a carrying path, a storage vessel, and an inner member of an apparatus for treatment in a vapor phase. Furthermore, the present invention may be applied to a member which may be contaminated with various contaminants, for example, an exterior or an interior member (e.g., a member for a building such as a window glass and a tile or a porcelain enamel-based building material and a cooking table; a member constituting a vehicle such as an automobile, e.g., an automobile body, a windshield, a window glass, a mirror, and a protective cover for a lamp), a fence (e.g., a highway fence such as a sound proof fence for an express way), and a protective cover member (e.g., a protective cover for a light source such as a lighting unit or a halogen lamp in a tunnel or in a house; a protective cover member for a precision machine such as a watch, a clock, or a camera; a display protective cover member such as a front panel for a picture or an image display device, e.g., a television, a personal computer, or a mobile phone; a protective cover member for a solar battery; and a protective cover for a signal lamp). Furthermore, the present invention may also be effectively applied, for example, to a member for inside of a clean room (e.g., a member for an inner wall, a flooring member, a casing member of an apparatus in a clean room, and an exterior member therefor), a metal mold (e.g., a metal mold for an injection molding), an optical member (such as a lens including a pickup lens, a prism, a light reflector, or a mirror), a member constituting an image-forming apparatus (or device) or an acoustic device (e.g., a head such as a printer head or a magnetic head, and a transfer roll for transferring a toner to a substrate sheet), a member for an electronic machine or an electronic telecommunications apparatus (e.g., a recording medium such as a CD or a DVD, and a member for recording or reading data).

According to the present invention, the adhesion of the contaminants can be prevented over a long period of time. Moreover, even though the contaminants attach to the member, the contaminants are easily cleaned up with a simple cleaning manner (cleaning, e.g., wiping out and other operation or manner). Accordingly, the present invention is preferably applied to a member to be deposited or adhered by the contaminants in a liquid phase or in a vapor phase. Such a member may be a member used in or subjected to a liquid phase (or a member of a surface coating or processing apparatus for surface treating a base material or a substrate by application of liquid phase thereto or by the virtue of liquid phase), for example, a glass for a water tank, a glass used for an aquarium, and a transparent member (such as a glass) for a viewing window in a plant. The member preferably includes a member that may be exposed to a processing space (or a processing space under a reduced pressure or an atmosphere processing under a reduced pressure, a processing space containing floating or flying particles or an atmosphere containing floating or flying particles) of an apparatus (or a chamber) for surface processing a base material or a substrate by a vapor phase method. The above-mentioned member includes, for example, a member constituting the surface process apparatus (specifically, a member constituting at least an inner surface of or a member disposed in the surface process apparatus).

The surface process by the vapor phase method may include a physical vapor deposition (PVD), a chemical vapor deposition (CVD), an ion beam mixing, an etching, an impurity doping, or the like. Incidentally, the surface process using the vapor phase method may utilize a gaseous component (such as oxygen, nitrogen, or argon gas) in addition to a component such as a ceramic, a metal, a metal compound, an organo-metallic compound, or an organic substance (e.g., a fluorocarbon resin and a polyimide resin), depending on the species of thin-layer processing or lithographic techniques (or thin-film processing methods), and the like. For example, a component forming the following layer may be used: a layer for an electrode or a layer for a wire (or an interconnection), a resistance layer, a dielectric layer, an insulating layer, a magnetic layer, a conductive layer, a superconductive layer, a semiconductive layer, a protective layer, an abrasion-resistant layer, a very hard (or high hard) layer, a corrosion resistance layer, a heat-resistant layer, and a decoration layer.

The physical vapor deposition may include a deposition (or a vacuum deposition), for example, a deposition using a heating means such as a resistance heating, a flash evaporation, an arc evaporation, a laser heating, a high-frequency heating, or an electron beam heating; an ion plating technique utilizing a ionization process such as a high-frequency wave, a direct current, or a hollow cathode discharge (HCD) (for example, a hollow cathode discharge (HCD) process, an electron process, a beam RF process, and an arc discharge process); a sputtering (e.g., a sputtering utilizing a direct current discharge, an RF discharge or the like (for example, a glow discharge sputtering, an ion beam sputtering, and a magnetron sputtering)); a molecular beam epitaxy process, and the other process. The sputtering may be conducted with a reactive gas, for example, an oxygen source (e.g., oxygen), a nitrogen source (e.g., nitrogen and ammonia), a carbon source (e.g., methane and ethylene), and a sulfur source (e.g., hydrogen sulfide). These reactive gases may be used in combination with a sputtering gas, e.g., a noble gas such as argon and hydrogen.

The chemical vapor deposition may include a thermal CVD process, a plasma CVD process, an MOCVD process (an organo-metallic chemical vapor deposition), a photo-induced-CVD process (a CVD process utilizing rays such as ultraviolet rays and laser beams), and a CVD process utilizing a chemical reaction, and others.

The etching may include a dry etching, for example, a vapor phase etching such as a plasma etching, a reactive ion etching, or a micro wave etching. The etching gas (a reactive gas) in the dry etching depends on the kind of base materials or substrates and may include a fluorine-containing gas (e.g., tetrafluoromethane, hexafluoroethane, trifluoromethane, $BF_3$, $NF_3$, $SiF_4$, and $SF_6$), a chlorine-containing gas (e.g., chlorine, hydrogen chloride, carbon tetrachloride, dichlorofluoromethane, trichlorofluoromethane, $BCl_3$, $PCl_3$, and $SiCl_4$), or the like. The gases may be used in combination with an addition gas (e.g., a simple gas such as helium, neon, argon, hydrogen, nitrogen, or oxygen, and a compound gas such as methane, ethane, or ammonia). As far as the etching gas may be supplied into the processing space, the gas may also be supplied into the space between the electrodes in the same manner as in the reactive etching. The impurity doping may include a vapor phase heat diffusion process, an ion implantation process (an ionic implantation), a plasma doping process, or the like. The source of impurities (or a dopant) may be an arsenic compound (e.g., $AsH_3$), a boron compound (e.g., $B_2H_6$ and $BCl_3$), a phosphorus compound (e.g., $PH_3$), or the others. Besides the above-mentioned processes, the surface process by the vapor phase method includes a surface melting treatment with a laser or with a charged beam.

The surface process (or the surface fabrication) utilizing such a vapor phase method for a base material or a substrate may include a surface process (a microfabrication and/or a thin-film processing or lithographic process) in a semiconductor manufacturing apparatus, a liquid crystal display device, and an optical apparatus or a part thereof (e.g., a CCD and a shadow mask) and a sensor (e.g., a temperature sensor and a distortion sensor); a functional layer forming process or treatment (a formation of a magnetic layer of a magnetic tape, a magnetic head or the like, an optical layer formation, a conductive layer formation, an insulating layer formation, a formation of a layer for a magnetometric sensor, or the like); and a coating treatment (for example, a coating or covering of an automobile part, an industrial tool or a precision machinery component (or a part), an optical component, a general merchandise, or the like, e.g., a formation of a functional layer such as a reflective layer, a heat-resistant layer, a corrosion-resistant layer, an abrasion-resistant layer, or a decoration layer). The preferable surface process includes a microfabrication and/or a thin-film processing or lithography.

For the base material or the substrate that is treated by the above-mentioned vapor phase method, various materials may be used depending on the species of the surface treatments, and may include, for example, a metal (e.g., aluminum, silicon, germanium, and gallium), diamond, a ceramic [for example, a metal oxide (e.g., a glass, a quartz or a silica, an alumina, and sapphire), a metal silicide (e.g., silicon carbide, silicon nitride, and silicide), a metal nitride (e.g., boron nitride and aluminum nitride), and a boride (e.g., titan boride)], a plastic or a resin (e.g., a film or a molded article in the form of a sheet, and a molded article such as a casing or a housing).

Such a surface process by vapor phase method (vapor phase surface process) utilizes the adhesion of scattering or flying particles (e.g., the particles for deposition and the sputtered particles) to the base material or to the substrate, regardless whether the particles are accelerated or ionized or not. Therefore, the scattering or flying particles adhere or deposit to an inner surface (or an inner wall) of the apparatus and accumulate thereon to contaminate the inner surface (or an inner wall) of the vapor phase surface process apparatus. In these cases, the surface process apparatus itself and the constituting member thereof require the frequent maintenance for cleaning, and the continuous operation of the apparatus causes a growth of the adhered components to form particles and contaminates the surface processed base material or substrate. As a result, the production cost increases with decreasing the process yield of the surface processed base materials or substrates.

On the other hand, using the member subjected to the treatment with the superheated water vapor as a constituting member of the surface processing apparatus can effectively prevent the adhesion of the various contaminants including the scattering or the flying particle, particularly, the particle generated in the surface processing step using the vapor phase method. The constituting member of the surface process apparatus such as a chamber includes, particularly, a member contacting with a processing space in the surface process apparatus, for example, a member constituting at least an inner surface or an inner wall, or a member disposed in the surface process apparatus. Examples of the member include various members to be disposed in the surface process apparatus, for example, a base material or a substrate to be treated by the vapor phase method (for example, the microfabrication and/or the thin-film processing or lithography), an electrode member (e.g., an electrode member being contactable with (or exposed to) an etching gas or a generated particle in the etching apparatus), a holder or a supporter (e.g., a holder for a base material or a substrate to be treated, a holder for an electrode, a target holder, a susceptor, and a prop (or brace member)), a boat, a covering member and a shielding member or a cap member (e.g., an inner shielding cover, a fixed block cover, a screw cap, and a block cap for a prop (or brace member)), an insulator, a member constituting an inlet or an exhaust duct (or breather) or a member constituting a channel (e.g., a baffle member and a diffuser), and an inner wall or an interior member (for example, an inner wall member such as an inner wall board, a corner member, an inner wall gate member, a tube member of an inner wall, a member for an observation window, for example, a sensor window for a process detection unit in the vapor phase method (e.g., an end point detection unit), and a frame such as a corner frame), a plate (e.g., a face plate, a pumping plate, a blocker plate, and a cooling plate), and a joining or a fixing member (e.g., a fixing block, a screw such as a bolt or a screw nut, a coupling, a flange, a joint, a ring (e.g., a clamp ring, a set ring, an earth ring, and an inner ring), and a tube).

In practice, the preferred member to be treated may usually comprise an inorganic substance (e.g., a ceramic and a metal), and includes, for example, a window member (e.g., a transparent member such as a glass or a quartz glass) for observing the inside of the vapor phase surface process apparatus (a chamber) and a member exposed to or contacted with the etching gas or the generated particle (for example, a member having pores through which an etching gas such as a chlorine gas may passes, such as an upper electrode and/or a lower electrode for the dry etching apparatus) and the like.

The above-mentioned member (for example, a member constituting the surface process apparatus and the base material or the substrate to be treated by a microfabrication and/or a thin-film processing or lithography) has a surface or an area that comprises at least an inorganic material or an inorganic substance. The member comprising an inorganic substance may comprise the various of elements, for example, an element of the Group 4 of the Periodic Table of Elements (e.g., titanium and zirconium), an element of the Group 5 of the Periodic Table of Elements (e.g., vanadium, niobium, and tantalum), an element of the Group 6 of the Periodic Table of Elements (e.g., chromium, molybdenum, and tungsten), an element of the Group 7 of the Periodic Table of Elements (e.g., manganese), an element of the Group 9 of the Periodic Table of Elements (e.g., cobalt and rhodium), an element of the Group 10 of the Periodic Table of Elements (e.g., nickel, palladium, and platinum), an element of the Group 11 of the Periodic Table of Elements (e.g., copper, silver, and gold), an element of the Group 13 of the Periodic Table of Elements (e.g., boron, aluminum, gallium, and indium), and an element of the Group 14 of the Periodic Table of Elements (e.g., carbon, silicon, and germanium). The inorganic substance may contain an element of the Group 15 of the Periodic Table of Elements (e.g., nitrogen and phosphorus), an element of the Group 16 of the Periodic Table of Elements (e.g., oxygen), and an element of the Group 17 of the Periodic Table of Elements (a halogen such as fluorine). In practice, the member comprising the inorganic substance may usually comprise an element of the Group 4 of the Periodic Table of Elements (e.g., titanium and zirconium), an element of the Group 5 of the Periodic Table of Elements, an element of the Group 13 of the Periodic Table of Elements (e.g., aluminum), and an element of the Group 14 of the Periodic Table of Elements (e.g., silicon and germanium) (particularly, at least one element selected from silicon and aluminum).

The above-mentioned member to be treated includes, for example, at least one member selected from the group consisting of a ceramic [e.g., a metal oxide (an oxide ceramic such as a glass, a quartz or a silica, an alumina or an aluminum oxide, a silica-alumina, sapphire, zirconia, titania or titanium oxide, mulite, or beryllia), a metal silicide (a ceramic silicide such as silicon carbide or silicon nitride), a metal nitride (a ceramic nitride such as boron nitride, carbon nitride, aluminum nitride, or titanium nitride), a boride (a ceramic boride such as carbon boride, titanium boride, or zirconium boride), a metal carbide (a ceramic carbide such as silicon carbide, titanium carbide, or tungsten carbide), and a porcelain enamel], a metal (a simple metal, e.g., a silicon such as a single crystal silicon, a polycrystalline silicon, or an amorphous silicon, titanium, aluminum, and germanium; an alloy such as an iron-base alloy (e.g., a stainless steel), a titanium alloy, a nickel alloy, or an aluminum alloy), a carbonaceous material, and diamond.

Furthermore, the above-mentioned member may have been subjected to a surface treatment or a processing (for example, an oxidation treatment, a nitridation treatment, and a boridation treatment). For example, a metal member such as aluminum or an alloy thereof may have been subjected to a surface treatment (e.g., an anodization) or an oxidation treatment such as an anodizing (e.g., an anodizing with sulfuric acid, an anodizing with oxalic acid, an anodizing with chromic acid, and an anodizing with phosphoric acid). In practice, an anodized aluminum or an anodized aluminum alloy may be usually treated by a sealing. These members may be used singly or in combination. Moreover, the member to be treated may be a conductive member or a semiconductive member, or an insulating or a non-conductive member. Furthermore, the member may be a hydrophobic member or a hydrophilic member. In addition, the member may also be an opaque, a translucent or a transparent member.

In practice, the member to be treated may usually be contactable with a processing space of a layer-forming or a surface process apparatus (e.g., a chamber-constituting member) using the vapor phase method. Such a member may include, for example, a ceramic (e.g., a silica or a glass such as a quartz glass and an oxide ceramic such as alumina), a metal (e.g., a metal such as silicon or aluminum and an alloy such as an aluminum alloy), and an oxidized metal (e.g., an anodized aluminum or an anodized aluminum alloy).

As the superheated water vapor, there may be used a superheated water vapor (a saturated water vapor) usually having a temperature higher than about 200° C., and particularly, a superheated water vapor (a saturated water vapor) having a temperature not lower than about 300° C. (for example, about 300 to 1200° C.). As the superheated water vapor, there may be employed a superheated saturated water vapor usually having a temperature not lower than about 300° C. (for example, about 300 to 1000° C.), preferably about 330 to 1000° C. (for example, about 350 to 1000° C.), more preferably about 370 to 900° C. (for example, about 380 to 800° C.), and particularly about 400 to 750° C. (for example, about 450 to 700° C.). The superheated water vapor may be generated by a conventional manner, for example, a superheated water vapor-generating apparatus comprising a water vapor-generating unit (such as a boiler for generating a saturated water vapor) and a superheating unit for superheating the water vapor from the water vapor-generating unit to a predetermined temperature by a superheating means (such as a high-frequency induction heating). The superheated water vapor from the superheating unit of the superheated water vapor-generating apparatus is sprayed or jetted to the member to be treated (the member accommodated or held in the processing unit) for exposing or treating the untreated member with the superheated water vapor. Incidentally, in the surface-treatment, a predetermined site (or area) of the member may be selectively treated by using a mask or the like.

Depending on the species of the members or the like, the amount to be used of the superheated water vapor for the treatment may be selected from a range of about 50 g to 200 kg/h (for example, about 150 g to 150 kg/h) in terms of water vapor (or flow rate) relative to 1 m² of the surface area of the untreated member. The amount (or the flow rate) of the superheated water vapor in terms of water vapor relative to 1 m² of the surface area of the member may be, for example, about 100 g to 100 kg/h, preferably about 250 g to 80 kg/h, more preferably about 500 g to 60 kg/h (for example, about 1 to 50 kg/h), and may be about 5 to 45 kg/h (for example, about 10 to 40 kg/h), and usually about 10 to 100 kg/h.

The treatment time with the superheated water vapor may be selected from a range of, for example, about 10 seconds to 6 hours depending on the species of the member to be treated, and may usually be about 1 minute to 2.5 hours (for example, about 2 to 120 minutes), preferably about 5 minutes to 2 hours (for example, about 10 to 90 minutes), and more preferably about 10 minutes to 1.5 hours (for example, about 15 to 60 minutes). The treatment time may be about 20 seconds to 50 minutes, preferably about 30 seconds to 45 minutes (for example, about 45 seconds to 40 minutes), and more preferably about 1 to 40 minutes (for example, about 5 to 30 minutes).

The treatment of the member may be conducted under an oxygen or an oxygen-containing atmosphere (e.g., in air), as well as under a non-oxidizing atmosphere (or an inactive gas) such as nitrogen gas, helium gas, or argon gas.

According to the treatment mentioned above, the member can effectively prevent the adhesion of the contaminants. Furthermore, hydrophilicity and/or antistatic properties (electrostatic eliminating properties) of the member can be improved. The surface potential of the member (for example, an insulating member such as a quartz glass) treated with the superheated water vapor may be measured, for example, by scanning at a predetermined speed (90 cm/min) in accordance with the method defined by JIS (Japanese Industrial Standards) L-1094 at a temperature of 20° C. and a humidity of 40% RH. The surface potential of the treated member that is measured by the above manner may be about 0 to ±75 V, preferably about 0 to ±70 V, more preferably about 0 to ±60 V, and particularly about 0 to ±50 V at a scanning time of 0 to 120 seconds. More specifically, the surface potential of the member treated with the superheated water vapor may be about 0 to ±30 V (for example, about 0 to ±25 V, preferably about 0 to ±20 V) at a scanning time of 0 second, about 0 to ±50 V (for example, about 0 to ±40 V, preferably about 0 to ±30 V) at a scanning time of 30 seconds, 0 to ±70 V (for example, about 0 to ±60 V, preferably about 0 to ±50 V) at a scanning time of 60 seconds, about 0 to ±75 V (for example, about 0 to ±70 V, preferably about 0 to ±60 V) at a scanning time of 90 seconds, and about 0 to ±75 V (for example, about 0 to ±70 V, preferably about 0 to ±60 V) at a scanning time of 120 seconds.

When the member treated with the superheated water vapor (the modified member) is approached cigarette ashes stored in a container (e.g., a Petri-dish) at a distance of 1 cm under the condition of a temperature of 20° C. and a humidity of 40% RH, the member does not have the adhesion of the cigarette ash and has a remarkably high non-electrostatic property or electrostatic eliminating property. In this ash test, the member may be subjected to the test after rubbing the member (the sample) with a dry cloth (a cotton cloth) for 10 seconds or without rubbing. Even in the both cases, the member has the high non-electrostatic property or the high electrostatic eliminating property.

Furthermore, for example, when the member to be treated (e.g., an insulating member such as a quartz glass) is sprayed or jetted with the superheated water vapor having a temperature of 500° C. and an amount of 5 kg/h in terms of water vapor (or flow rate) for about 10 to 20 minutes and the obtained member is deposed in the surface process apparatus using the vapor phase method, even after substrates and the like are subjected to the microfabrication or the thin-film processing or lithography in the surface process apparatus, the treated member can suppress the increase of surface potential. More specifically, the surface potential of the member (for example, the quartz glass) treated with the superheated water vapor can be measured by the following manner: after a plurality of the substrates are repeatedly subjected to a microfabrication or a thin-film processing in a surface processing apparatus (or a vacuum chamber) such as a dry etching apparatus or a plasma etching apparatus or the like, the member is detached from the surface process apparatus to measure the surface potential at a temperature of about 15 to 25° C. (for example, about 20° C.) and a humidity of about 55 to 70% RH (for example, about 60% RH). According to the above-mentioned method, the surface potential of the electrically insulating member (e.g., the quartz glass) may be, for example, about −3 to +2 kV (for example, about −2.7 to +1.5 kV, preferably about −2.5 to +1 kV, and more preferably −2.3 to +0.7 kV). Incidentally, depending on the species of the electrical insulating member, the surface potential of the electrical insulating member treated with the superheated water vapor may be positive (plus) or negative (minus).

Furthermore, the treatment with the superheated water vapor imparts high hydrophilicity to the member to be treated. In other words, a contact angle of water on the treated member is remarkably reduced in comparison with the contact angle of water on the untreated member. When the contact angle of water for the member treated with the superheated water vapor is measured under the condition of a temperature of about 15 to 25° C. (for example, about 20° C.) and a humidity of about 55 to 70% RH (for example, about 60% RH), the contact angle $X_2$ of the treated member with the superheated water vapor may, for example, be about 10 to 100°, preferably about 15 to 95°, and more preferably 20 to 90° (for example, about 30 to 85°), and about 40 to 97° depending on the species of the member to be treated. More specifically, an oxide ceramic or an oxide metal may have a contact angle of water of, for example, about 30 to 100°, preferably about 35 to 95°, and more preferably about 40 to 95°. An alumina treated by the superheated water vapor may have a contact angle of water of about 30 to 60° (for example, about 35 to 55°, and more preferably about 40 to 50°); a quartz treated by the superheated water vapor may have a contact angle of water of about 80 to 105° (for example, about 85 to 100° and more preferably about 90 to 100°); and an aluminum subjected to an anodizing and a sealing treatment may have an contact angle of water of about 30 to 80° (for example, about 35 to 70° and more preferably about 40 to 60°). Moreover, a metal such as silicon treated by the superheated water vapor may have a contact angle of water of about 10 to 25°, preferably about 10 to 23°, and more preferably about 10 to 20°.

Incidentally, the contact angle of water on a member without treatment by the superheated water vapor is as follows; an alumina may have a contact angle of water of about 70 to 80°; a quartz may have a contact angle of water of about 110 to 120°; an aluminum subjected to an anodizing and a sealing may have a contact angle of water of about 100 to 110°; and a silicon may have a contact angle of water of about 40 to 50°. In other words, the contact angle of water on the member treated with the superheated water vapor is lower than the contact angle of water on the untreated member. More specifically, assuming a contact angle of water on an untreated member is $X_1$ and a contact angle of water on the member treated with the superheated water vapor is $X_2$ under the condition of a temperature of about 15 to 25° C. (for example, about 20° C.) and a humidity of about 55 to 70% RH (for example, about 60% RH), $\Delta(X_1-X_2)$ may be about 15 to 70°, preferably about 18 to 65°, and more preferably about 20 to 60° (for example, about 25 to 55°). Further, such a high hydrophilicity is sustained over a long period of time. For example, the decrease rate of the contact angle of water is only about 5 to 40% (preferably about 10 to 35%) even after irradiating an ultra sonic on the treated member in an aqueous hydrogen peroxide for 3 hours. More specifically, when the quartz glass is treated by spraying or jetting the superheated water vapor having a temperature of 500° C. in an amount (or a flow rate) of 5 kg/h in terms of water vapor for 10 to 20 minutes, the contact angle of water may be, for example, about 85 to 100° under the condition of a temperature of 20° C. and a relative humidity of 60% RH. Even though the treated quartz glass is irradiated with an ultra sonic in an aqueous hydrogen peroxide for 3 hours, the contact angle of water is about 60 to 70°. Contrarily, when the quartz glass is irradiated with an ultra sonic in an aqueous hydrogen peroxide for 3 hours before the treatment with superheated water vapor, the contact angle of water thereof is reduced to about 10 to 20°.

Moreover, the treatment with the superheated water vapor seems to inactivate the member and to decrease the reactivity with a reactive component (a reactive gas or the like) and the affinity of the member for the contaminants. Further, an X-ray photo electron spectrum (XPS) analysis shows a decrease in the carbon atomic concentration and an increase in the oxygen atomic concentration of the surface of the member surface-treated with the superheated water vapor.

When the depth profile of the surface of the member treated with the superheated water vapor (or the surface-modified member) is analyzed by an X-ray photo electron spectrum, the member has a decreased carbon atomic concentration (atomic %) and an increased oxygen atomic concentration (atomic %) in comparison with the surface of an untreated member. When the depth profile of the surface of the member treated with the superheated water vapor (or the surface-modified member) is analyzed by an X-ray photo electron spectrum ("ESCA3300" manufactured by SHIMADZU CORPORATION), the relationship between the carbon atomic concentration and an etching time (at an etching speed of 5 nm/min) is as follows: about 10 to 50% (for example, about 15 to 45%) at an etching time of 0 second, about 5 to 35% (for example, about 7 to 30%) at an etching time of 15 seconds, about 5 to 30% (for example, about 7 to 25%) at an etching time of 30 seconds, and about 3 to 25% (for example, about 5 to 20%) at an etching time of 60 seconds; and the relationship between the oxygen atomic concentration and an etching time (at an etching speed of 5 nm/min) is as follows: about 30 to 60% (for example, about 33 to 55%) at an etching time of 0 second, about 35 to 62% (for example, about 40 to 60%) at an etching time of 15 seconds, about 43 to 63% (for example, about 45 to 60%) at an etching time 30 seconds, and about 45 to 65% (for example, about 50 to 60%) at an etching time of 60 seconds.

More specifically, in the oxide ceramic, the oxide metal, and the metal, the relationships between the carbon atomic concentration and the oxygen atomic concentration, and the etching time are as follows:

(A) Member comprising a ceramic (e.g., an oxide ceramic) or an alumite:

TABLE 1

| (1) Carbon atomic concentration (atomic %) | | | | |
|---|---|---|---|---|
| Etching time | 0 second | 15 seconds | 30 seconds | 60 seconds |
| Range (atomic %) | 10 to 50 | 7 to 35 | 5 to 30 | 3 to 25 |
| Preferable range | 12 to 47 (e.g., 15 to 45) | 8 to 32 (e.g., 10 to 30) | 6 to 28 | 3 to 23 |
| More preferable range | 15 to 45 (e.g., 17 to 45) | 10 to 28 | 7 to 25 | 3 to 22 |
| The typical member has the following carbon atomic concentration (atomic %). Alumina: | | | | |
| Range (atomic %) | 15 to 50 (e.g., 17 to 48) | 7 to 35 | 5 to 27 | 3 to 25 |
| Preferable range | 20 to 47 (e.g., 23 to 47) | 10 to 32 | 6 to 25 | 3 to 23 |
| More preferable range | 25 to 45 | 12 to 30 | 7 to 23 (e.g., 10 to 23) | 3 to 20 (e.g., 5 to 20) |
| Quartz or glass: | | | | |
| Range (atomic %) | 10 to 50 | 8 to 35 (e.g., 10 to 33) | 7 to 30 (e.g., 10 to 30) | 6 to 25 |
| Preferable range | 15 to 45 (e.g., 17 to 42) | 12 to 32 (e.g., 10 to 30) | 10 to 28 | 8 to 23 |
| More preferable range | 18 to 42 | 13 to 30 | 12 to 25 | 10 to 22 (e.g., 10 to 20) |

TABLE 1-continued

| | (1) Carbon atomic concentration (atomic %) | | | |
|---|---|---|---|---|
| Etching time | 0 second | 15 seconds | 30 seconds | 60 seconds |
| | Anodized aluminum: | | | |
| Range (atomic %) | 20 to 40 | 12 to 30 | 10 to 25 | 5 to 20 (e.g., 6 to 20) |
| Preferable range | 22 to 37 | 14 to 27 (e.g., 15 to 25) | 12 to 23 | 10 to 20 |
| More preferable range | 25 to 35 | 18 to 25 | 15 to 20 | 10 to 16 (e.g., 10 to 15) |

TABLE 2

| | (2) Oxygen atomic concentration (atomic %) | | | |
|---|---|---|---|---|
| Etching time | 0 second | 15 seconds | 30 seconds | 60 seconds |
| Range (atomic %) | 30 to 60 | 35 to 62 (e.g., 40 to 60) | 43 to 63 (e.g., 45 to 60) | 45 to 65 (e.g., 50 to 62) |
| Preferable range | 32 to 58 | 40 to 60 (e.g., 42 to 59) | 42 to 60 | 45 to 62 (e.g., 50 to 60) |
| More preferable range | 33 to 57 (e.g., 35 to 55) | 42 to 58 | 45 to 59 | 50 to 60 |
| The typical member has the following carbon atomic concentration (atomic %). | | | | |
| | Alumina: | | | |
| Range (atomic %) | 30 to 55 (e.g., 32 to 52) | 35 to 57 (e.g., 40 to 55) | 43 to 63 (e.g., 43 to 60) | 45 to 62 (e.g., 48 to 60) |
| Preferable range | 32 to 50 (e.g., 33 to 47) | 40 to 55 | 42 to 60 | 45 to 59 |
| More preferable range | 34 to 47 (e.g., 35 to 45) | 42 to 53 | 45 to 57 | 50 to 58 |
| | Quartz or glass: | | | |
| Range (atomic %) | 30 to 60 (e.g., 33 to 58) | 35 to 62 | 40 to 63 (e.g., 43 to 60) | 45 to 63 |
| Preferable range | 35 to 58 (e.g., 37 to 58) | 40 to 60 | 45 to 60 | 47 to 61 |
| Mare preferable range | 38 to 57 (e.g., 40 to 55) | 45 to 58 | 48 to 58 | 50 to 60 |
| | Anodized aluminum: | | | |
| Range (atomic %) | 40 to 58 | 48 to 60 | 50 to 62 | 55 to 65 |
| Preferable range | 43 to 56 | 50 to 60 | 53 to 60 | 55 to 62 |
| More preferable range | 46 to 55 | 52 to 58 (e.g., 53 to 57) | 55 to 59 | 58 to 60 |
| (B) Oxygen atomic concentration of a metal (e.g., silicon) | | | | |
| Range (atomic %) | 32 to 45% | 28 to 42% | 22 to 36% | 13 to 25% |
| Preferable range | 35 to 42% | 30 to 40% | 23 to 34% | 14 to 22% |
| More preferable range | 37 to 40% | 32 to 38% | 24 to 32% | 16 to 20% |

Furthermore, compared with an untreated member, the reduction rate of the carbon atomic concentration of the member treated with the superheated water vapor (or the surface-modified member) is about 10 to 80% (for example, about 15 to 75%, more preferably about 17 to 70%) at an etching time of 0 second; about 15 to 90% (for example, about 20 to 85% and preferably 25 to 80%) at an etching time of 15 seconds; about 20 to 90% (for example, about 22 to 85% and preferably about 25 to 80%) at an etching time of 30 seconds; and 20 to 90% (for example, about 22 to 85% and preferably 25 to 80%) at an etching time of 60 seconds.

Comparing with an untreated member, the increase rate of the oxygen atomic concentration of the member treated with the superheated water vapor (or the surface-modified member) may be about 15 to 120% (for example, about 17 to 110% and preferably about 20 to 100%) at etching time of 0 second; 10 to 150% (for example, about 12 to 140%, preferably about 13 to 135%, and more preferably about 15 to 120%) at an etching time of 15 seconds; about 7 to 130% (for example, 8 to 120% and preferably about 10 to 110%) at an etching time of 30 seconds; and about 5 to 125% (for example, about 7 to 120%, preferably about 8 to 110%, and more preferably about 10 to 100%) at an etching time of 60 seconds.

It is sufficient that the surface-modified member of the present invention shows the carbon atomic concentration and the reduction rate of the carbon atomic concentration or the oxygen atomic concentration and the increase rate of the oxygen atomic concentration at any one of the etching times. The surface-modified member of the present invention may satisfy the atomic concentrations, and the reduction and the increase rates at all of the etching times or at a plurality of the etching times (for example, at 0 second, 15 seconds, and 30 seconds).

INDUSTRIAL APPLICABILITY

As described above, the surface-treatment with the superheated water vapor can effectively prevent the adhesion of the contaminants to the treated member (the obtained member). Moreover, the treatment improves the antistatic properties of the member and imparts hydrophilicity to the member with decreasing surface tension. Accordingly, the present invention is applicable to various applications or fields and useful to treat, particularly, a member constituting the processing unit (e.g., a chamber) of the surface process apparatus utilizing the vapor phase method (such as an apparatus utilizing a PVD, a CVD, an ion-beam mixing, an etching, or an impurity doping). In addition, the use of the surface-modified member for the surface process apparatus (e.g., a vacuum camber of a plasma apparatus) prevents an accumulation of contaminants on the member, so that an abnormal discharge can be avoided.

EXAMPLES

Hereinafter, the following examples are intended to describe this invention in further detail and should by no means be interpreted as defining the scope of the invention.

Examples 1 to 4 and Comparative Examples 1 to 4

Each of four quartz glass plates (116 mm×116 mm×8 mm) was surface-treated by spraying or jetting a superheated water vapor (a temperature of 500° C., a flow rate of 5 kg/h) for 10 to 20 minutes. The treated glass plates were individually attached to a sensor window for detecting an end point of etching of each of four dry etching apparatuses. Then the four apparatuses were actuated for dry etching the predetermined number of substrates (glass substrates). After the dry etching, each of the quartz glass plates was detached from the sensor windows to observe the contamination degree of the quartz glass. As Comparative Examples, four untreated quartz glass plates were used, and each degree of the contamination of the quartz glass plates was also observed in the same manner as in Examples. Incidentally, the dry etching apparatuses used were apparatuses that generated mainly a resist, a fluorine layer, and an aluminum layer.

Before being attached to the sensor window, each surface potential or each electrostatic potential of the quartz glass plate was measured by using an apparatus (an electro static fieldmeter: FMX-002 type manufactured by SIMCO JAPAN, INC) at a temperature of 21° C. and a humidity of 62% RH, and the degree of the contamination of the quartz glass was visually observed according to the following criteria.

A: very clean, and any changes are not observed in comparison with the quartz glass before the dry etching.

B: clean, and the transparency is slightly decreased in comparison with the quartz glass before the dry etching.

C: slightly contaminated, and the transparency is decreased in comparison with the quartz glass before the dry etching.

D: severely contaminated, and changed into translucent or unclear in comparison with the quartz glass before the dry etching.

The results are shown in Table 3.

TABLE 3

| Etching apparatus | | Number of treated substrates | Electrostatic potential (kV) | Degree of contamination |
|---|---|---|---|---|
| No. 1 | Ex. 1 | 2000 | 1.8 | A |
| | Com. Ex. 1 | 2000 | −2.8 | C |
| No. 2 | Ex. 2 | 1500 | 0.68 | B |
| | Com. Ex. 2 | 1500 | −0.32 | D |
| No. 3 | Ex. 3 | 2000 | 1.02 | B |
| | Com. Ex. 3 | 2000 | −0.15 | D |
| No. 4 | Ex. 4 | 1000 | −1.9 | A |
| | Com. Ex. 4 | 1000 | −2.1 | C |

Incidentally, the quartz glass plate of Comparative Example 1 had a resist contamination on the four corners, the quartz glass plate of Comparative Example 2 had a considerable resist contamination on the center area, the quartz glass plate of Comparative Example 3 had a resist contamination all over its surface and the plate became semitransparent, and the quartz glass plate of Comparative Example 4 had a resist contamination and an aluminum layer allover its surface. Moreover, those contaminations were not removed by even wiping with a cloth containing a solvent. On the contrary, in Examples 1 to 4, even though each surface-treated glass plate was also attached to each of the sensor window of the dry etching apparatus, the contaminations were remarkably reduced. Furthermore, even after the quartz glass that had used in Example 1 was attached to the sensor window of the dry etching apparatus again and the apparatus was actuated for further dry etching about 5000 substrates, the adhesion of the contaminants to the glass was not observed as well as in Example 1. In addition, the quartz glass plate used in Example 2 was attached to the sensor window of the dry etching apparatus again, and the apparatus was actuated for further dry etching about 5000 substrates, and after the dry etching, the glass plate was detached from the sensor window and observed. Although the transparency of the plate was reduced, the glass plate was easily cleaned by wiping with a cloth containing a solvent and became transparent again.

Incidentally, after detaching the quartz glass plates in Examples 1 and 4 from the sensor windows of the dry etching apparatuses, the plates were subjected to a washing with an aqueous sodium hydrate having a concentration of 5% by weight, and each light transmittance and each surface roughness (μm) were evaluated. The glass plates had a light transmittance of about 69 to 70%, an Ra (an arithmetic average roughness) of about 0.01 to 0.02 μm, an Rz (ten points average roughness) of about 0.09 to 0.12 μm, an Rp (largest of peak heights) of about 0.05 μm, and an Rv (largest of valley depths) of about 0.05 to 0.06 μm. In view of the light transmittance and the surface roughness, the quartz glass plates were not different from a new quartz glass plate (having a light transmittance of 70%, an Ra of 0.01 μm, an Rz of 0.08 μm, an Rp of 0.04 μm, and an Rv of 0.05 μm).

Example 5 and Comparative Example 5

A quartz glass plate (116 mm×116 mm×8 mm) was treated with the superheated water vapor in the same manner as in Example 1, and an untreated quartz glass plate was used as Comparative Example. Each of the quartz glass plates was immersed in an aqueous hydrogen peroxide and subjected to a sonication (a frequency of 5 kHz) for 3 hours, and the changes in time series of a contact angle of water were measured at a temperature of 20° C. and a relative humidity of 60% RH. The results are shown in FIG. 2.

Figure 2:
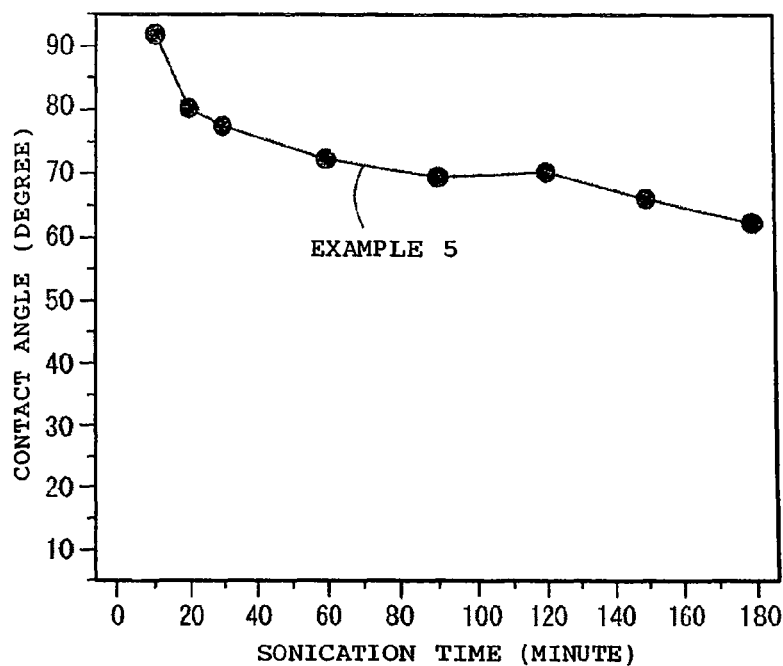
FIG. 2 represents a graph showing results obtained in Example 5.
Figure 3:
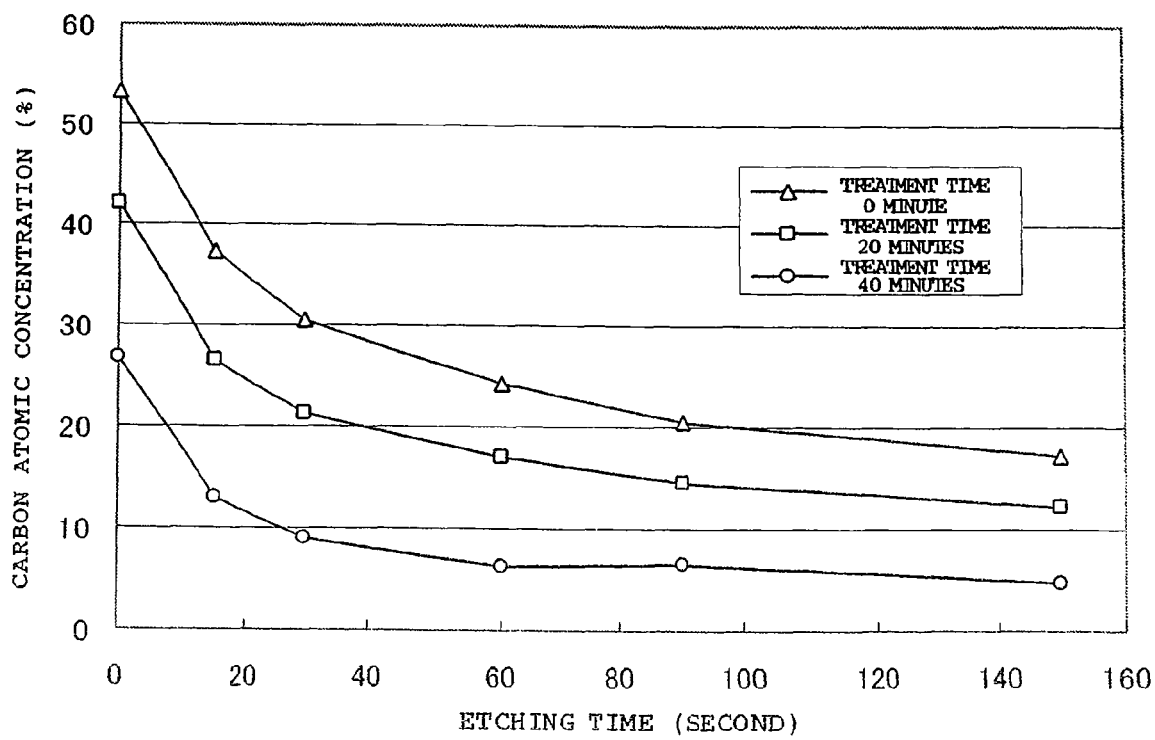
FIG. 3 represents a graph showing a relationship between a carbon atomic concentration and an etching time in Example 9 (an alumina).
Figure 4:
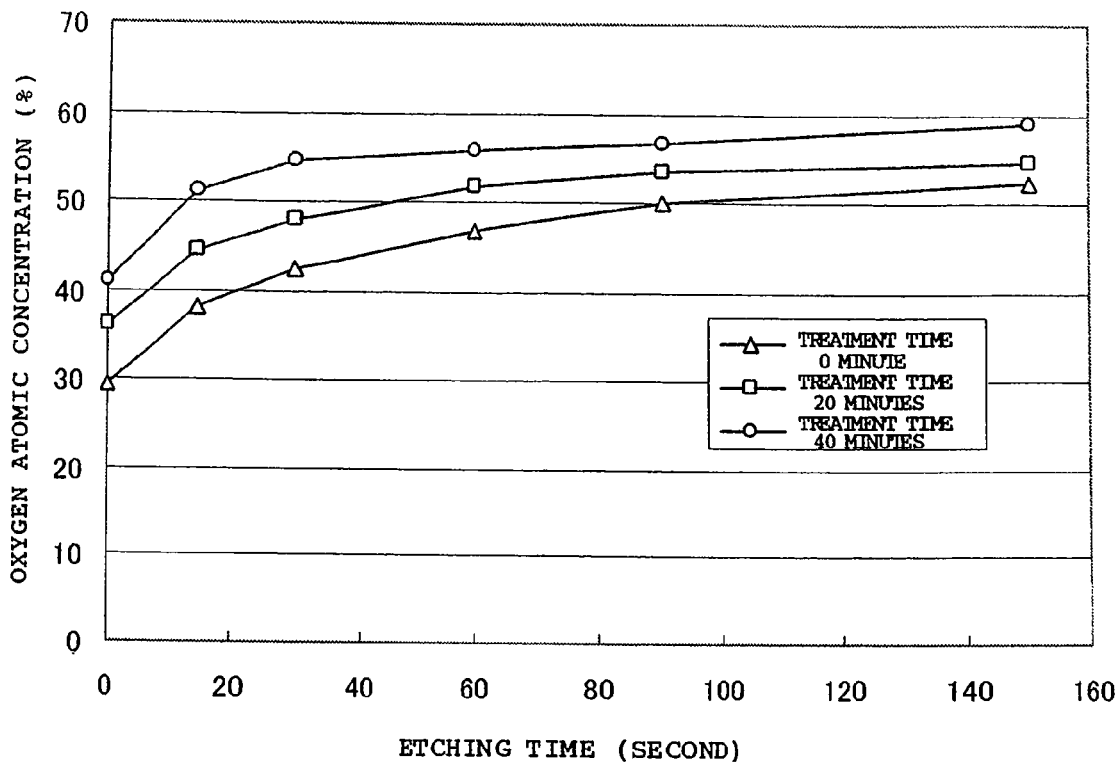
FIG. 4 represents a graph showing a relationship between an oxygen atomic concentration and an etching time in Example 9 (the alumina).
Figure 5:
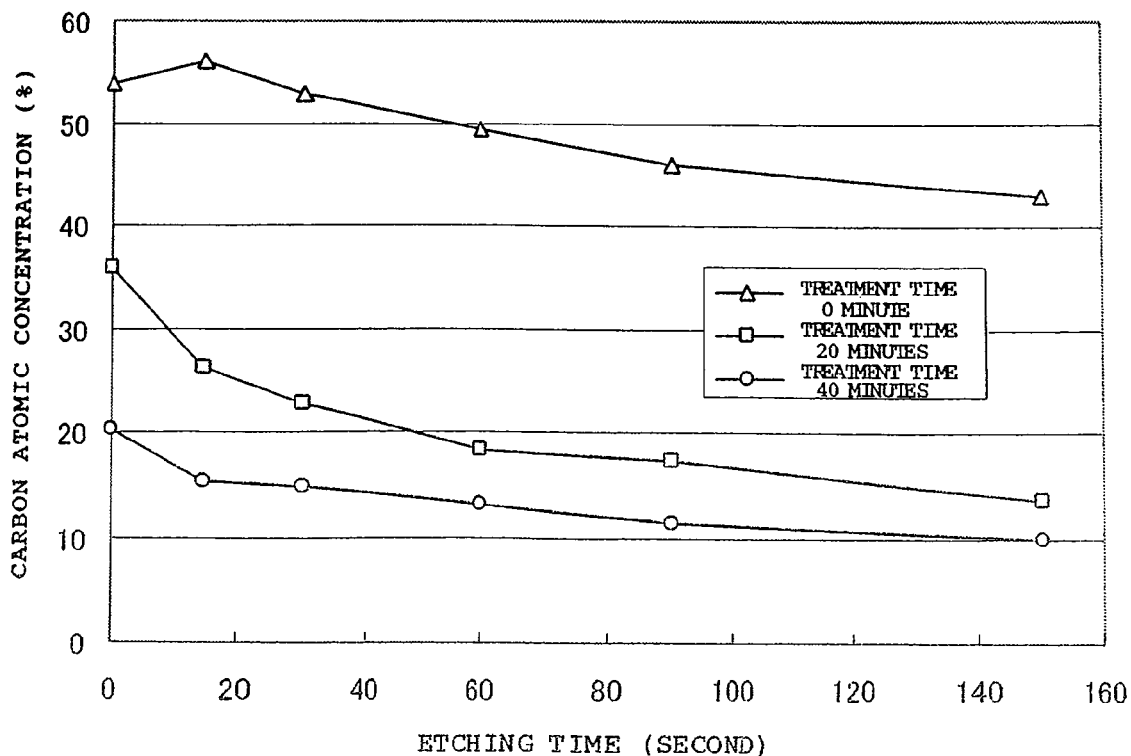
FIG. 5 represents a graph showing a relationship between a carbon atomic concentration and an etching time in Example 10 (a quartz glass).
Figure 6:
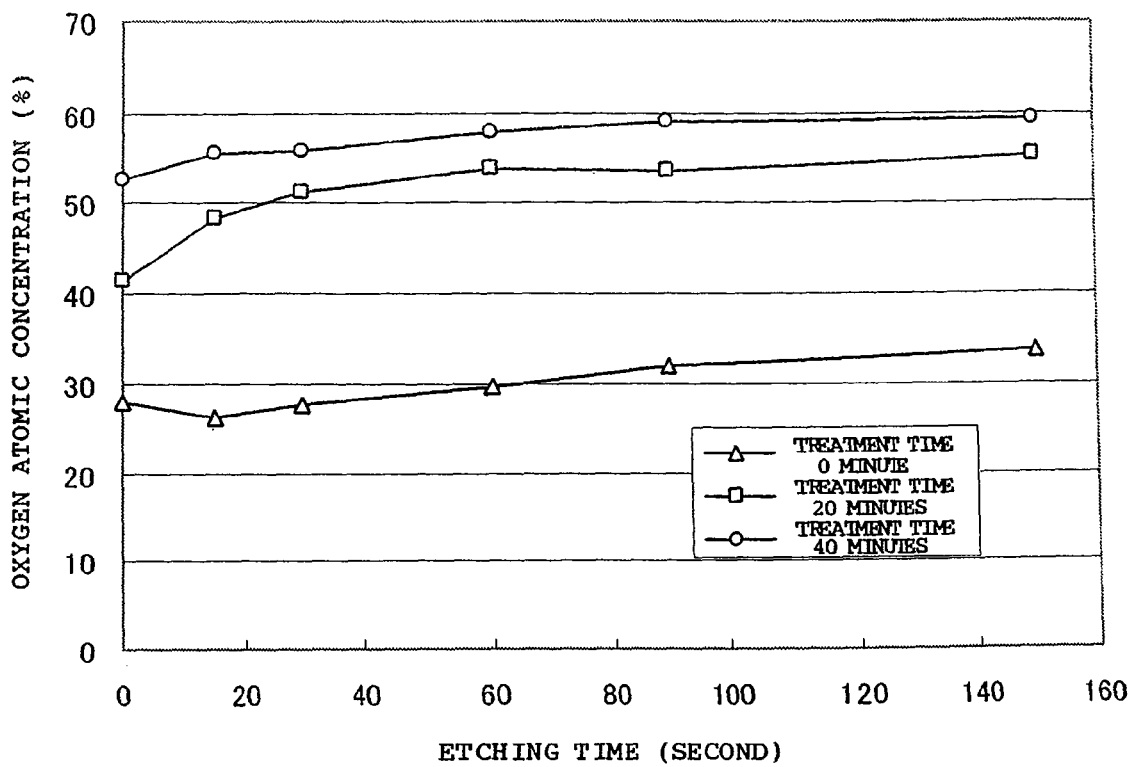
FIG. 6 represents a graph showing a relationship between an oxygen atomic concentration and an etching time in Example 10 (the quartz glass).
Figure 7:
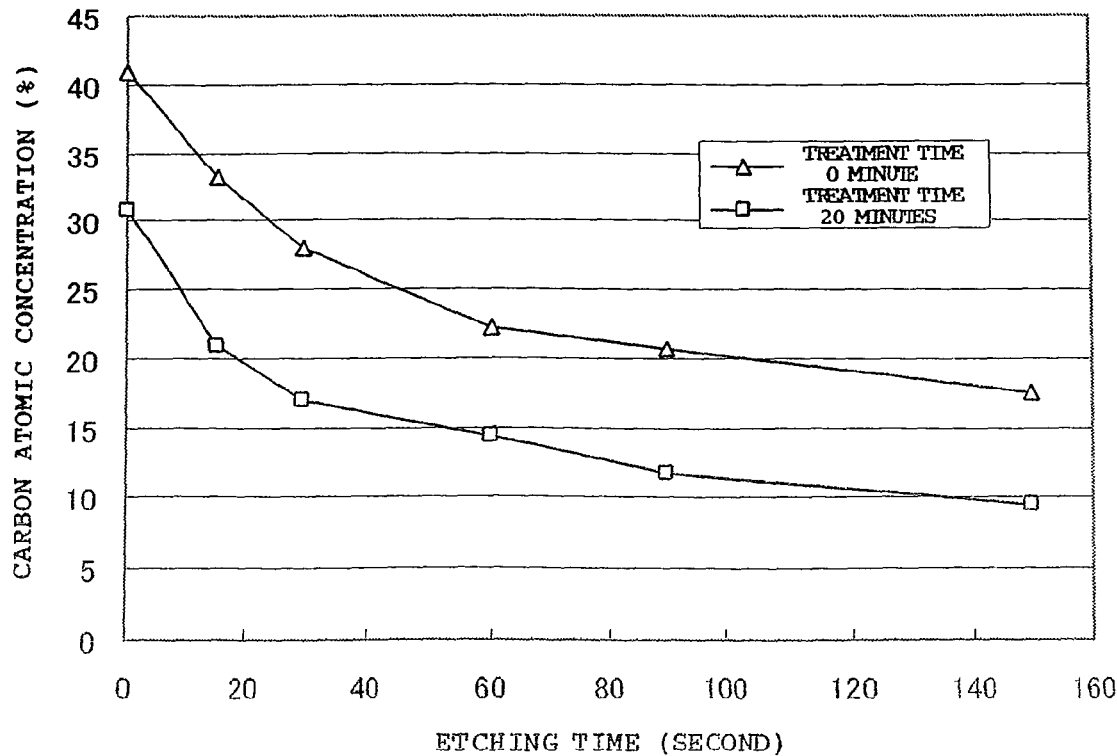
FIG. 7 represents a graph showing a relationship between a carbon atomic concentration and an etching time in Example 11 (an anodized aluminum).
Figure 8:
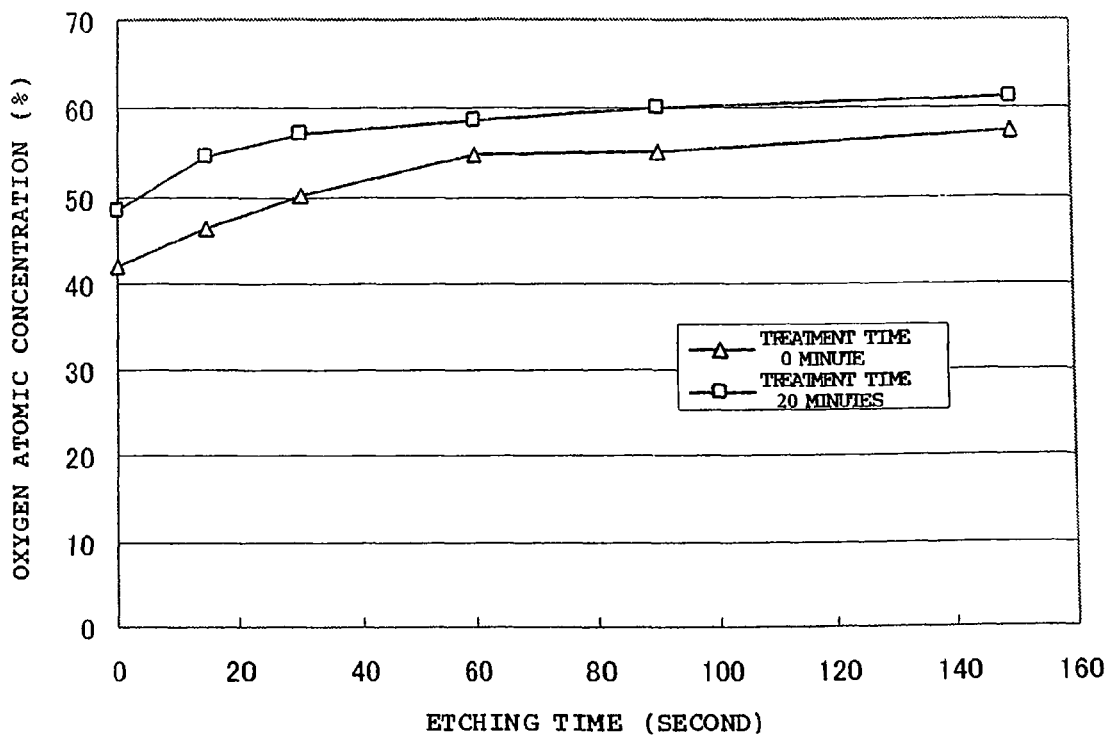
FIG. 8 represents a graph showing a relationship between an oxygen atomic concentration and an etching time in Example 11 (the anodized aluminum).
Figure 9:
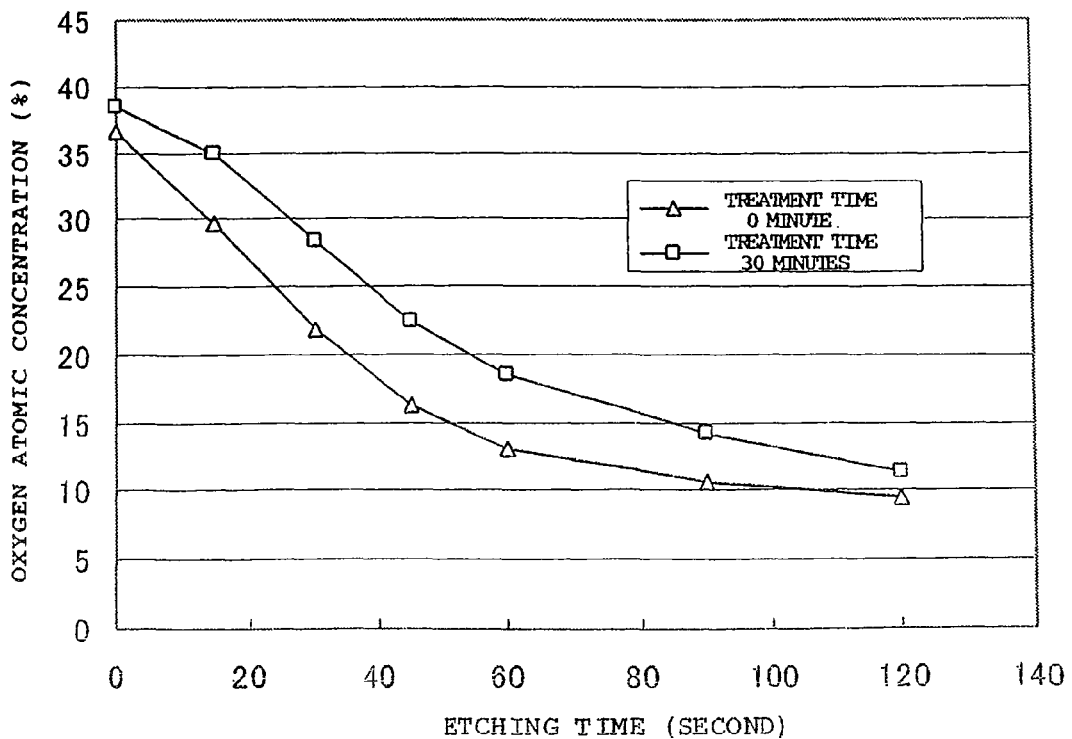
FIG. 9 represents a graph showing a relationship between an oxygen atomic concentration and an etching time in Example 12 (a silicon).

As apparent from FIG. 2, in Example, even after the plate was supersonically treated in the aqueous hydrogen peroxide for 3 hours, the plate sustained a contact angle of 62° as well as the initial contact angle of 93°.

Example 6 and Comparative Example 6

Each of the following plates was surface-treated by spraying or jetting a superheated water vapor (a temperature of 420° C., a flow rate of 60 kg/h) for 40 minutes; an alumina (an alumina ceramic) plate, a quartz glass plate, an aluminum plate anodized with sulfuric acid and sealed, and a polycrystalline silicon plate. The luster of the anodized aluminum plate was increased by the superheated water vapor treatment. Each of the contact angles of water on the plates was measured at a temperature of 20° C. and a relative humidity of 60% RH. As Comparative Example 6, each contact angles of water of the untreated plates were measured, and the reduction of the contact angle, which caused by the superheated water vapor treatment, was calculated. The results are shown in the following table.

TABLE 4

| Substrates | Comparative Example 6 ($X_1$) | Example 6 ($X_2$) | $\Delta(X_2 - X_1)$ |
| --- | --- | --- | --- |
| Alumina | 73.3° | 46.7° | 26.6° |
| Quarts glass | 117.7° | 95.4° | 22.3° |
| Anodized aluminum | 104.2° | 50.1° | 54.1° |
| Polycrystalline silicon | 47.8° | 15.6° | 32.2° |

As apparent from the table, the treatment with the superheated water vapor seems to reduce the contact angle of water and to hydrophilize the surface of the plate.

Example 7

A glass substrate (680 mm×780 mm) for a liquid crystal display (or is graded as a glass substrate for a liquid crystal display) was zoned in a longitudinal direction into four square areas A, B, C, and D at even interval. After the zones A, C, and D were masked with exposing only the zone B, the substrate was surface-treated by spraying or jetting a superheated water vapor (a temperature of 400° C., and a flow rate of 5 kg/h) for 3 minutes. Under the condition of a temperature of 21° C. and a humidity of 62% RH, the electrostatic potential of the glass before the surface treatment and the electrostatic potential of the glass after the surface treatment were measured by using the electro static fieldmeter (FMX-002 type manufactured by SHIMCO JAPAN, INC.) in the following manners.

I: measuring an electrostatic potential after 3 minutes from the treatment with the superheated water vapor II: measuring an electrostatic potential after rubbing the glass plate with a tissue paper in the direction from zones A to D III: measuring an electrostatic potential after rubbing the glass plate with a tissue paper in the direction from zones D to A IV: measuring an electrostatic potential after 60 minutes from the treatment with the superheated water vapor V: measuring an electrostatic potential after rubbing the glass plate with a tissue paper in the direction from zones A to D VI: measuring an electrostatic potential after rubbing the glass plate with a sheet of a cloth made of a polyester fiber in the direction from zones A to D VII: measuring an electrostatic potential after 24 hours from the glass plate was allowed to stand VIII: measuring an electrostatic potential after rubbing the glass plate that was allowed to stand for 24 hours with a cloth made of a polyester fiber in the direction from zones A to D The results are shown in the following table.

TABLE 5

| | Zones | | | |
| --- | --- | --- | --- | --- |
| | A | B | C | D |
| Initial | +0.2 | +0.2 | +0.2 | +0.2 |
| I: after 3 minutes from the treatment | +0.01 | +0.01 | +0.01 | +0.01 |
| II: rubbing the plate with a tissue paper in the direction from zones A to D | −0.04 | — | −0.04 | −0.04 |
| III: rubbing the plate with a tissue paper in the direction from zones D to A | +0.07 | — | +0.07 | +0.17 |
| IV: after 60 minutes from the treatment | +0.02 | 0.00 | +0.02 | +0.02 |
| V: rubbing the plate with a tissue paper in the direction from zones A to D | +0.04 | −0.06 | +0.04 | +0.04 |
| VI: rubbing the plate with a cloth made of a polyester fiber in the direction from zones A to D | +0.06 | 0.00 | +0.07 | +0.16 |
| VII: after 24 hours from the treatment | −0.02 | −0.02 | −0.02 | −0.02 |
| VIII: rubbing the plate with a cloth made of a polyester fiber in the direction from zones A to D | +0.14 | +0.06 | +0.12 | +0.16 |

As apparent from the table, the zone B treated with the superheated water vapor is liable to charge negative, suppresses the generation of an electrostatic charge by the friction, and maintains a lower electrostatic potential over a long period of time.

Example 8 and Comparative Example 7

A quartz glass plate (120 mm×120 mm×3 mm) was surface-treated by spraying or jetting a superheated water vapor (a temperature of 420° C., a flow rate of 60 kg/h) for 30 minutes. Then according to the test method defined by JIS L-1094, the electrostatic potential was measured by scanning the treated plate at a predetermined speed (90 cm/min) under the condition of a temperature of 20° C. and a humidity of 40% RH.

In addition, in order to evaluate the electrostatic properties qualitatively, under the condition of a temperature of 20° C. and a humidity of 40% RH, the treated plate without rubbing with a dry cloth (a cotton cloth) was approached cigarette ashes contained in a container at a distance of 1 cm, to observe whether the cigarette ash attached to the plate or not (ash test).

Incidentally, as Comparative Example 7, a quartz glass plate without the treatment with the superheated water vapor was used, and the electrostatic potential of the plate was measured and the ash test was conducted in the same manner as in Example 8. The results are shown in the following table.

TABLE 6

| | Scanning time | Comparative Example 7 | Example 8 |
|---|---|---|---|
| Electrostatic potential (v) | 0 second | −37 | −3 |
| | 30 seconds | −92 | −8 |
| | 60 seconds | −117 | −28 |
| | 90 seconds | −122 | −30 |
| | 120 seconds | −97 | −32 |
| Ash test | | adhesion of 12 specks of large size ashes adhesion of very many fine ashes | completely free from ashes |

As apparent from the table, it is clear that the treatment with the superheated water vapor imparts antistatic properties to the plate and prevents the attachment of a dust or dirt to the plate.

Examples 9 to 12 and Comparative Examples 8 to 11

The following plates were surface-treated by spraying or jetting a superheated water vapor (a temperature of 420° C., a flow rate of 60 kg/h) respectively; an alumina (an alumina ceramic) plate (Example 9), a quartz glass plate (Example 10), an aluminum plate anodized with sulfuric acid and sealed (Example 11), and a polycrystalline silicon plate (Example 12). The treatment time with the superheated water vapor was 20 minutes or 40 minutes (incidentally, as for the silicon plate, the time was 30 minutes). The carbon atomic concentration (%) and the oxygen atomic concentration (%) of the surface of the plate treated with the superheated water vapor were analyzed by an X-ray photo electron spectrum analysis [XPS (X-ray photoelectron spectroscopy)] (apparatus "ESCA3300" manufactured by SHIMADZU CORPORATION) with sputtering the surface with argon ion. In the same manner as mentioned above, in Comparative Examples 8 to 11, each of the untreated plates was analyzed. Incidentally, the size of each plate was 120 mm×120 mm×3 mm and each surface of the sample plates was analyzed after removing an extraneous (or attached) matter by blowing an air flow. Further, the plates were corroded (or eroded) by sputtering at a speed of 5 nm/min. The results are shown in terms of an atom concentration (unit: %) in FIG. 3 to FIG. 9.

As apparent from FIG. 3 to FIG. 9, the treatment with the superheated water vapor decreases the carbon atomic concentration and increases the oxygen atomic concentration of the surface layer of the inorganic member such as an oxidized ceramic. Further, the treatment with the superheated water vapor increases the oxygen atomic concentration of the surface layer of the metal member such as silicon. Because the inorganic member shows the above-mentioned behaviors by the treatment with the superheated water vapor, the antistatic properties and hydrophilicity seem to be improved.

Example 13

An aluminum plate (an upper electrode of a dry etching apparatus), having a large number of micropores having a mean pore diameter of 570 μm and had been anodized with sulfuric acid and sealed, was surface-treated by spraying or jetting a superheated water vapor (a temperature of 350° C., a flow rate of 5 kg/h) for 15 minutes. The luster of the surface of the plate was increased by the treatment.

The invention claimed is:

1. A surface-modified member comprising at least one member selected from the group consisting of a ceramic and a metal and preventing an adhesion of contaminants, which is free from an attachment of ashes in an ash test and has a decrease in a carbon atomic concentration and an increase in an oxygen atomic concentration on the modified surface thereof compared with a surface of an untreated member in an X-ray photo electron spectrum analysis, wherein the surface-modified member comprises at (1) least one element selected from the group consisting of an element of Group 4 of the Periodic Table of Elements, an element of Group 5 of the Periodic Table of Elements, an element of Group 6 of the Periodic Table of Elements, an element of Group 7 of the Periodic Table of Elements, an element of Group 9 of the Periodic Table of Elements, an element of Group 10 of the Periodic Table of Elements, an element of Group 11 of the Periodic Table of Elements, an element of Group 13 of the Periodic Table of Elements and an element of Group 14 of the Periodic Table of Elements, (2-1) the member comprising the ceramic or an alumite has any one of the following carbon atomic concentrations:
10 to 50% at an etching time of 0 second,
7 to 35% at an etching time of 15 seconds,
5 to 30% at an etching time of 30 seconds, and
3 to 25% at an etching time of 60 seconds; and
any one of the following oxygen atomic concentrations:
30 to 60% at an etching time of 0 second,
35 to 62% at an etching time of 15 seconds,
43 to 63% at an etching time of 30 seconds, and
45 to 65% at an etching time of 60 seconds
when a depth profile of the surface of the member is analyzed by an X-ray photo electron spectrum at an etching speed of 5 nm/min, or (2-2) the member comprising the metal has any one of the following oxygen atomic concentrations:
32 to 45% at an etching time of 0 second,
28 to 42% at an etching time of 15 seconds,
22 to 36% at an etching time of 30 seconds, and
13 to 25% at an etching time of 60 seconds
when the depth profile of the surface of the member is analyzed by the X-ray photo electron spectrum at an etching speed of 5 nm/min, (3) the surface-modified member is a member contacting with or exposing to a processing space under a reduced pressure or a processing space containing floating or flying particles of an apparatus or a chamber for surface processing by a vapor phase method comprising a physical vapor deposition (PVD), a chemical vapor deposition (CVD), an ion beam mixing, an etching, or an impurity doping, and (4) the surface-modified member has been treated by a water vapor consisting essentially of a superheated water vapor having a temperature of not lower than about 300° C. under air.

2. The surface-modified member according to claim 1, which comprises the ceramic or the alumite and has any one of the following reduction rates of the carbon atomic concentration:
10 to 80% at an etching time of 0 second,
15 to 90% at an etching time of 15 seconds,
20 to 90% at an etching time of 30 seconds, and
20 to 90% at an etching time of 60 seconds; and
any one of the following increase rates of the oxygen atomic concentration:
15 to 120% at an etching time of 0 second,
10 to 150% at an etching time of 15 seconds,
7 to 130% at an etching time of 30 seconds, and
5 to 125% at an etching time of 60 seconds, compared with an untreated member, when the depth profile of the surface of the member is analyzed by the X-ray photo electron spectrum analysis at an etching speed of 5 nm/min.

3. The surface-modified member according to claim 1, which has a contact angle of water of 10 to 100°, said contact angle of water being 15 to 70° lower than a contact angle of water of an untreated member.

4. The surface-modified member according to claim 1, which comprises an oxide ceramic, an oxidized metal or a metal, wherein the oxide ceramic, the oxidized metal or the metal comprises at least one element selected from the group consisting of an element of the Group 4 of the Periodic Table of Elements, an element of the Group 5 of the Periodic Table of Elements, an element of the Group 13 of the Periodic Table of Elements, and an element of the Group 14 of the Periodic Table of Elements.

5. The surface-modified member according to claim 1, which comprises an oxide ceramic, an oxidized metal or a metal, wherein the oxide ceramic, the oxidized metal or the metal comprises at least one element selected from the group consisting of silicon and aluminum.

6. The surface-modified member according to claim 1, which comprises at least one selected from the group consisting a silica or a glass, an alumina, an anodized aluminum or an anodized aluminum alloy, silicon, and aluminum or an alloy thereof.

7. A process for preventing contaminants from adhering to an untreated member, which comprises surface-treating the member with a water vapor consisting essentially of a superheated water vapor having a temperature of not lower than about 300° C. under air,
  wherein the member comprises at least one member selected from the group consisting of a ceramic and a metal,
  wherein (1) the member comprises at least one element selected from the group consisting of an element of Group 4 of the Periodic Table of Elements, an element of Group 5 of the Periodic Table of Elements, an element of Group 6 of the Periodic Table of Elements, an element of Group 7 of the Periodic Table of Elements, an element of Group 9 of the Periodic Table of Elements, an element of Group 10 of the Periodic Table of Elements, an element of Group 11 of the Periodic Table of Elements, an element of Group 13 of the Periodic Table of Elements and an element of Group 14 of the Periodic Table of Elements;
  (2-1) the member comprising the ceramic or an alumite has any one of the following carbon atomic concentrations:
  10 to 50% at an etching time of 0 second,
  7 to 35% at an etching time of 15 seconds,
  5 to 30% at an etching time of 30 seconds, and
  3 to 25% at an etching time of 60 seconds; and
  any one of the following oxygen atomic concentrations:
  30 to 60% at an etching time of 0 second,
  35 to 62% at an etching time of 15 seconds,
  43 to 63% at an etching time of 30 seconds, and
  45 to 65% at an etching time of 60 seconds
when a depth profile of the surface of the member is analyzed by an X-ray photo electron spectrum at an etching speed of 5 nm/min, or
  (2-2) the member comprising the metal has any one of the following oxygen atomic concentrations:
  32 to 45% at an etching time of 0 second,
  28 to 42% at an etching time of 15 seconds,
  22 to 36% at an etching time of 30 seconds, and
  13 to 25% at an etching time of 60 seconds when the depth profile of the surface of the member is analyzed by the X-ray photo electron spectrum at an etching speed of 5 nm/min, and
  (3) the surface-modified member is a member contacting with or exposing to a processing space under a reduced pressure or a processing space containing floating or flying particles of an apparatus or a chamber for surface processing vapor phase method comprising a physical vapor deposition (PVD), a chemical vapor deposition (CVD), an ion beam mixing, an etching, or an impurity doping.

8. A process according to claim 7, wherein the untreated member is treated with a superheated water vapor having a temperature of 300 to 1000° C.

9. A process according to claim 7, wherein the untreated member is a member which is contactable with a processing space in a surface process apparatus using a vapor phase method.

10. A process according to claim 7, wherein the untreated member constitutes at least an inner surface of a surface process apparatus or is disposed in the surface process apparatus.

11. A process according to claim 7, wherein the untreated member is a base material or a substrate to be processed by a vapor phase method; or at least one member selected from the group consisting of an electrode member, a holder or a supporter, a boat, a covering member, a shielding member or a cap, an insulator, a constituting member for an inlet or an exhaust duct or a constituting member for a channel, an inner wall or an interior member, a plate, and a joining or a fixing member.

12. A process according to claim 7, wherein the untreated member is a constituting member of an observation window for observing inside of a surface process apparatus using a vapor phase method or a member having pores through which an etching gas passes.

13. A process according to claim 7, wherein the untreated member comprises an oxide ceramic, an oxidized metal or a metal, and the oxide ceramic, the oxidized metal or the metal comprises at least one element selected from the group consisting of an element of the Group 4 of the Periodic Table of Elements, an element of the Group 5 of the Periodic Table of Elements, an element of the Group 13 of the Periodic Table of Elements, and an element of the Group 14 of the Periodic Table of Elements.

14. A process according to claim 7, wherein the untreated member comprises an oxide ceramic, an oxidized metal or a metal, and the oxide ceramic, the oxidized metal or the metal comprises at least one element selected from the group consisting of silicon and aluminum.

15. A process according to claim 7, wherein the untreated member is treated with a superheated water vapor of 100 g/h to 100 kg/h in terms of water vapor relative to 1 m$^2$ of a surface area of the member.

16. A process according to claim 7, wherein the untreated member is treated with a superheated water vapor to prevent an adhesion of contaminants generated in a surface process using a vapor phase method.

17. A process according to claim 9, wherein the vapor phase method comprises a physical vapor deposition, a chemical vapor deposition, an ion beam mixing technique, an etching technique, or an impurity doping technique.

18. A process according to claim 15, wherein the untreated member is treated with the superheated water vapor to improve a hydrophilicity, antistatic properties or both.

* * * * *